US008568600B2

(12) United States Patent
Kang et al.

(10) Patent No.: US 8,568,600 B2
(45) Date of Patent: Oct. 29, 2013

(54) TOUCH SCREEN PANEL AND METHOD OF MANUFACTURING THE SAME

(75) Inventors: Sung-Ku Kang, Yongin (KR); Jung-Mok Park, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 998 days.

(21) Appl. No.: 12/631,788

(22) Filed: Dec. 4, 2009

(65) Prior Publication Data

US 2010/0182274 A1   Jul. 22, 2010

(30) Foreign Application Priority Data

Jan. 16, 2009 (KR) .................. 10-2009-0003638

(51) Int. Cl.
*C03C 15/00* (2006.01)
*C03C 21/00* (2006.01)
*C03B 33/02* (2006.01)

(52) U.S. Cl.
USPC .......... 216/17; 216/13; 216/16; 216/41; 216/58; 216/80; 345/173; 345/174; 428/43; 428/192; 428/210; 65/30.14; 65/31; 225/2

(58) Field of Classification Search
USPC ............. 216/41, 13, 16, 17, 58, 80; 345/173, 345/174; 428/192, 210, 43; 63/30.14; 225/2; 65/30.14, 31
See application file for complete search history.

(56) References Cited

U.S. PATENT DOCUMENTS

| 5,733,622 | A | * | 3/1998 | Starcke et al. ............. 428/64.1 |
| 7,030,860 | B1 | * | 4/2006 | Hsu et al. ..................... 345/173 |
| 8,393,175 | B2 | * | 3/2013 | Kohli et al. ................. 65/30.14 |
| 2008/0277375 | A1 | * | 11/2008 | Paek et al. ...................... 216/17 |
| 2009/0090694 | A1 | * | 4/2009 | Hotelling et al. ............. 216/41 |
| 2009/0324899 | A1 | * | 12/2009 | Feinstein et al. .......... 428/195.1 |
| 2011/0183116 | A1 | * | 7/2011 | Hung et al. ................... 428/156 |
| 2011/0298730 | A1 | * | 12/2011 | Hong et al. .................. 345/173 |
| 2012/0135177 | A1 | * | 5/2012 | Cornejo et al. ................ 428/43 |
| 2012/0135195 | A1 | * | 5/2012 | Glaesemann et al. ....... 428/156 |
| 2012/0251800 | A1 | * | 10/2012 | Nakayama et al. .......... 428/210 |
| 2013/0037308 | A1 | * | 2/2013 | Wang et al. .................. 174/250 |

FOREIGN PATENT DOCUMENTS

| JP | 2005164798 A | * | 6/2005 |
| KR | 10-2005-0072680 | | 7/2005 |
| KR | 1020080019125 A | | 3/2008 |
| KR | 020080058862 A | | 6/2008 |
| KR | 10-2008-0102446 A | | 11/2008 |
| KR | 10-2008-0108811 A | | 12/2008 |

OTHER PUBLICATIONS

KIPO Office action dated Oct. 29, 2010 in priority Korean application No. 10-009-0003638.
KIPO Office action dated May 31, 2011, for Korean priority Patent application 10-2009-0003638.

* cited by examiner

*Primary Examiner* — Lan Vinh
*Assistant Examiner* — David Kaufman
(74) *Attorney, Agent, or Firm* — Christie, Parker & Hale, LLP

(57) ABSTRACT

A method of manufacturing touch screen panels includes forming a photoresist film on a first surface of a substrate having high transmittance, removing the photoresist film in regions between unit cells by utilizing exposing and developing processes, etching the substrate in the regions where the photoresist film has been removed, removing the photoresist film from the substrate after the etching, performing a tempering process on the substrate including the etched regions, forming touch screen panels at the unit cells defined by the etched regions on the first surface of the substrate, and cutting the substrate at the etched regions to separate the touch screen panels.

7 Claims, 4 Drawing Sheets

Display Panel Direction

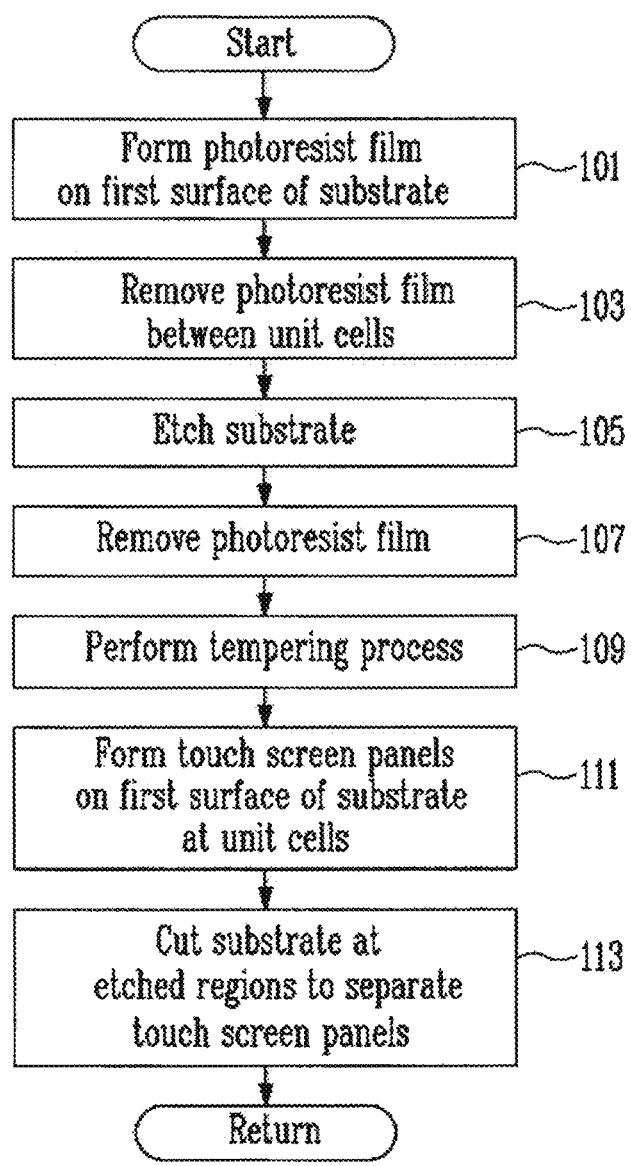

TOUCH SCREEN PANEL AND METHOD OF MANUFACTURING THE SAME

CROSS-REFERENCE TO RELATED APPLICATION

This application claims priority to and the benefit of Korean Patent Application No. 10-2009-0003638, filed on Jan. 16, 2009, in the Korean Intellectual Property Office, the entire content of which is incorporated herein by reference.

BACKGROUND OF THE INVENTION

1. Field of the Invention

The present invention relates to a touch screen panel provided in an image display device.

2. Description of the Related Art

A touch screen panel is an input device capable of inputting a user's instructions by allowing the user to select content displayed on a screen of an image display device using the user's finger or a similar object.

To this end, the touch screen panel is provided on a front face of the image display device to convert information of a contact position that directly contacts the user's finger or similar object into an electrical signal. Therefore, the content selected at the contact position is received as an input signal.

Since touch screen panels can replace an additional input device, such as a keyboard and/or a mouse, applications of touch screen panels are widely expanding.

When the touch screen panel is attached to the panel of the image display device, a size of the image display device increases, such that ease of portability may be reduced.

Furthermore, in typical touch screen panels, a window is additionally provided on the upper surface of the touch screen panel in order to improve the strength (e.g., breaking strength) of the device, which further increases the thickness of the touch screen panel.

SUMMARY OF THE INVENTION

Accordingly, exemplary embodiments of the present invention provide a touch screen panel with an integrated window, in which first and second sensing electrodes are formed on the window, such that the thickness of the touch screen panel is minimized or reduced, and in which a tempering process is performed on a glass substrate, used as the window, while in a mother cell state so that the strength of the touch screen panel is improved and mass production can be realized, and a method of manufacturing the same.

In an exemplary embodiment of the present invention, there is provided a method of manufacturing touch screen panels, including forming a photoresist film on a first surface of a substrate having high transmittance, removing the photoresist film in regions between unit cells by utilizing exposing and developing processes, etching the substrate in the regions where the photoresist film has been removed, removing the photoresist film from the substrate after the etching, performing a tempering process on the substrate including the etched regions, forming touch screen panels at the unit cells defined by the etched regions on the first surface of the substrate, and cutting the substrate at the etched regions to separate the touch screen panels.

The forming the touch screen panels at the unit cells may include sequentially forming first sensing patterns, second sensing patterns, an insulating layer, an adhesive layer, a buffer film, and a ground electrode layer at each of the unit cells.

The performing the tempering process may include steeping the substrate in a $KNO_3$ solution to heat the substrate at a temperature between 400° C. and 450° C. for approximately 15 to 18 hours.

In another exemplary embodiment of the present invention, there is provided a touch screen panel, including a substrate having high transmittance, sensing patterns on a first surface of the substrate, and an insulating layer on the sensing patterns. The first surface of the substrate and a second surface of the substrate opposite the first surface, excluding an edge region of the second surface of the substrate, is tempered.

The touch screen panel may further include an adhesive layer on the insulating layer, a ground electrode layer on the adhesive layer, and may still further include a buffer film between the adhesive layer and the ground electrode layer. The buffer film may comprise polyethylene terephthalate (PET).

The sensing patterns may include first sensing patterns and second sensing patterns on different layers. The first sensing patterns may be coupled to each other in a first direction, and the second sensing patterns may be coupled to each other in a second direction that crosses the first direction.

The substrate may comprise glass, and a sodium (Na) component on the tempered surface may have been replaced by a potassium (K) component.

As described above, according to exemplary embodiments of the present invention, the first and second sensing electrodes are formed on the window, such that the thickness of the touch screen panel can be minimized or reduced. In addition, the tempering process is performed on the substrate, used as the window, while in the mother cell state, so that the strength of the touch screen panel is improved and mass production can be realized.

BRIEF DESCRIPTION OF THE DRAWINGS

The accompanying drawings, together with the specification, illustrate exemplary embodiments of the present invention, and, together with the description, serve to explain the principles of the present invention.

FIG. 4 is a flow diagram illustrating a method of manufacturing touch screen panels according to an embodiment of the present invention.

DETAILED DESCRIPTION

Figure 1:
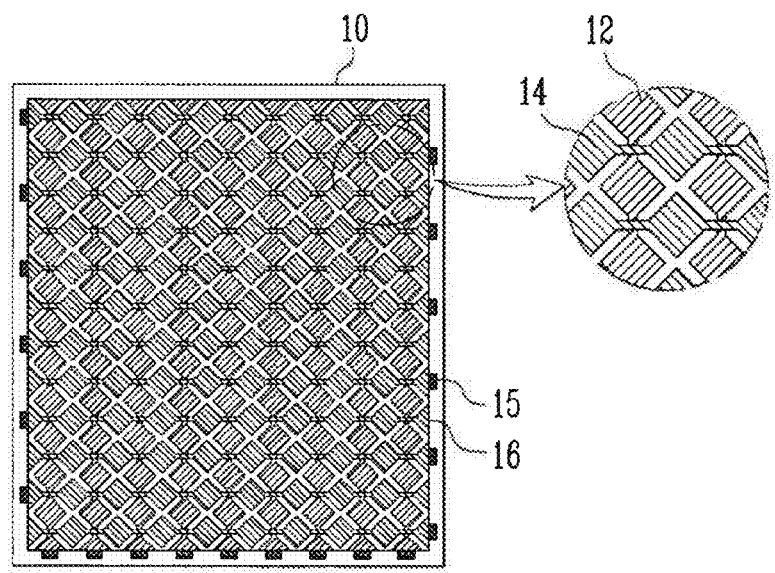
FIG. 1 is a plan view schematically illustrating a touch screen panel according to an embodiment of the present invention.

In the following detailed description, only certain exemplary embodiments of the present invention have been shown and described by way of illustration. As those skilled in the art will recognize, the described embodiments may be modified in various different ways without departing from the spirit or scope of the present invention. Accordingly, the drawings and description are to be regarded as illustrative in nature and not restrictive. In addition, when an element is referred to as being "on" another element, it may be directly on the other element, or may be indirectly on the other element, with one or more elements interposed therebetween. Also, when an element is referred to as being "coupled to" another element, it may be directly coupled to the other element, or may be indirectly coupled to the other element, with one or more elements coupled therebetween. Hereinafter, like reference numerals refer to like elements.

The window of a touch screen panel is generally formed of a tempered glass substrate. In this case, the glass substrate is cut into unit cells, and the unit cells are individually subjected to a tempering process. However, when the touch screen panel is manufactured predominantly at the unit cell level, as described above, mass production becomes difficult.

On the other hand, when the touch screen panel is manufactured using a window of a glass substrate that is not tempered, the strength of the window is reduced, thereby reducing the functionality of the window.

Embodiments of the present invention will be described in detail with reference to the accompanying drawings.

FIG. 1 is a plan view schematically illustrating a touch screen panel according to an embodiment of the present invention.

In one embodiment, the touch screen panel includes an integrated window in which sensing patterns are formed on a window substrate. After performing a tempering process on the window substrate while in a mother-cell unit, a plurality of touch screen panels are manufactured from the window substrate by cutting the window substrate into unit cells.

Referring to FIG. 1, a touch screen panel according to an embodiment of the present invention includes a plurality of sensing patterns 12 and 14 formed on a transparent substrate 10, metal patterns 15 for coupling the sensing patterns 12 and 14 to position detecting lines (not shown), and an insulating layer 16 formed to cover the sensing patterns 12 and 14.

The sensing patterns 12 and 14 include X sensing patterns 12 and Y sensing patterns 14 which are arranged to cross each other, with X sensing patterns 12 having a same X coordinate (e.g., arranged in a same column) being coupled to each other by column, and with Y sensing patterns 14 having a same Y coordinate (e.g., arranged in a same row) being coupled to each other by row.

For example, the X sensing patterns 12 include a plurality of X patterns formed so that sensing patterns having the same X coordinate in one column are coupled to each other in a first direction (e.g., the column direction). The Y sensing patterns 14 include a plurality of Y patterns formed so that sensing patterns having the same Y coordinate in one row are coupled to each other in a second direction (e.g., the row direction).

The X and Y sensing patterns 12 and 14 can be formed on different layers with an additional insulating layer interposed therebetween.

In this case, in a patterning process, the X sensing patterns 12 are patterned to be coupled to each other in a first direction, and the Y sensing patterns 14 are patterned to be coupled to each other in a second direction. Therefore, additional processes of forming contact holes and coupling patterns can be omitted, so that fewer masks are used and the manufacturing process is simplified.

However, it should be noted that the aforementioned process is only an illustrative embodiment of the present invention, but the present invention is not limited thereto.

For example, the X and Y sensing patterns 12 and 14 may be formed on a same layer. In this case, one of the X and Y sensing patterns 12 and 14 are formed to be coupled to each other in one of first or second directions in the patterning process, and the other one of the X and Y sensing patterns 12 and 14 are coupled to each other in the other one of the first or second directions in the processes of forming the contact holes and the coupling patterns.

The metal patterns 15 are arranged at edge regions of the X and Y sensing patterns 12 and 14 to couple the X and Y sensing patterns 12 and 14 to the position detecting lines (not shown).

To be more specific, the metal patterns 15 electrically couple the X and Y sensing patterns 12 and 14 by column or row to the position detecting lines for determining a contact position detecting signal to be supplied to a driving circuit.

The insulating layer 16 is made of a transparent insulating material that covers the sensing patterns 12 and 14.

When a contact object, such as a user's finger or a touch stick, contacts a touch screen panel, for example, an electrostatic capacitance type touch screen panel, a change in electrostatic capacitance in accordance with a contact position is transmitted from the sensing patterns 12 and 14 to the driving circuit via the metal patterns 15 and the position detecting lines. The change in the electrostatic capacitance is converted into an electric signal by X and Y input processing circuit (not shown) so that the contact position can be detected.

According to an embodiment of the present invention, the sensing patterns 12 and 14 are arranged in a plane parallel to a plane of a display panel (not shown). That is, in embodiments where the display panel is positioned under the touch screen panel, and where the contact surface is positioned at an upper surface of the touch screen panel, the sensing patterns 12 and 14 are formed under a transparent substrate 10.

The upper surface of the transparent substrate 10 functions both as the contact surface that a contact object contacts and as the window of the display device. That is, according to an embodiment of the present invention, an additional window is not provided, since the transparent substrate of the touch screen panel is integrated with the window. Therefore, the touch screen panel is thinner, manufacturing efficiency can be improved as manufacturing processes are simplified, and cost of materials can be reduced.

To this end, the tempering process is performed on the transparent substrate 10 for the transparent substrate 10 to also function as the window. According to an embodiment of the present invention, the tempering process of the transparent substrate 10 is not performed on unit cells, but is performed on a mother substrate before cutting the substrate into unit cells. Therefore, the strength of the touch screen panel is improved, and mass production can be realized.

Figure 2:
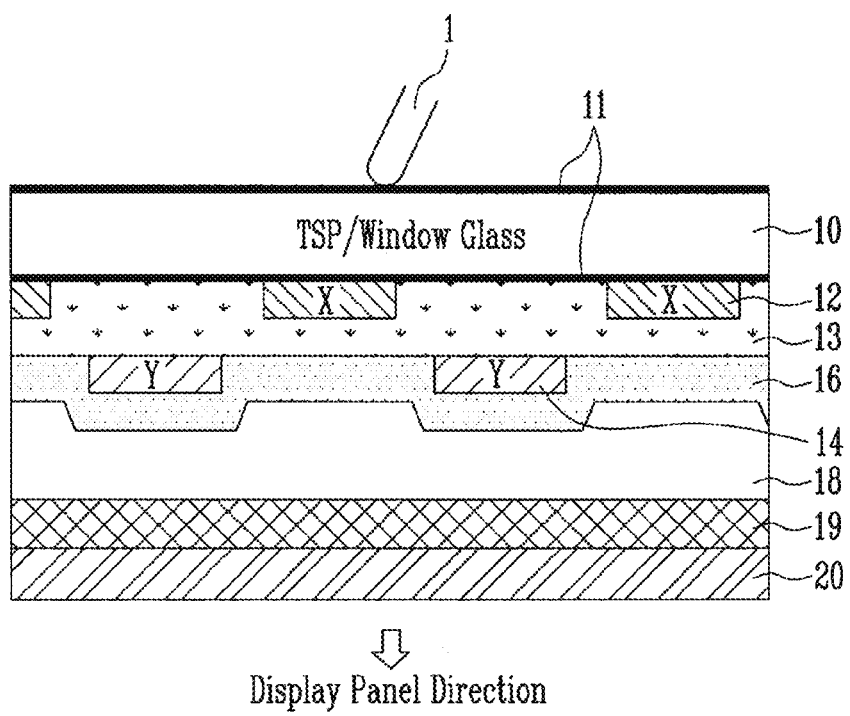
FIG. 2 is a schematic cross-sectional view illustrating a main portion of the touch screen panel according to the embodiment of the present invention.

FIG. 2 is a schematic cross-sectional view illustrating a main portion of a touch screen panel according to an embodiment of the present invention.

Referring to FIG. 2, the touch screen panel according to the embodiment of the present invention includes sensing patterns 12 and 14, a second insulating layer 16, a first adhesive layer 18, a buffer film 19, and a ground electrode layer 20, which are sequentially formed on one surface of a transparent substrate 10.

Here, a surface of the transparent substrate 10 on which the sensing patterns 12 and 14, the second insulating layer 16, the first adhesive layer 18, and the ground electrode layer 20 are formed is a surface facing a display panel, for example, a lower surface. The other surface of the transparent substrate 10 faces a direction from which a contact object 1 comes into contact. That is, the transparent substrate 10 is integrated with the window. The transparent substrate 10 can be made of a material such as glass. In some embodiments, the substrate 10 may not be 100% transparent, but may be made of a material that is almost 100% transparent or having relatively high transmittance.

The sensing patterns 12 and 14 are alternately arranged on different layers with a first insulating layer 13 made of a transparent material interposed therebetween. However, the present invention is not limited thereto. For example, the sensing patterns 12 and 14 may be arranged on the same layer.

The sensing patterns 12 and 14 are made of a transparent electrode material such as indium tin oxide (ITO), so that light emitted from the display panel positioned under the touch screen panel can transmit through the touch screen panel. The sensing patterns 12 and 14 are covered with the second insulting layer 16 made of a transparent material.

The first adhesive layer 18 is formed between the second insulating layer 16 and the ground electrode layer 20, to adhere the second insulating layer 16 to the ground electrode layer 20. The first adhesive layer 18 is made of a transparent adhesive material having high transmittance. For example, the first adhesive layer 18 can be made of super view resin (SVR) and/or optical cleared adhesive (OCA).

The ground electrode layer 20 is made of a transparent electrode material such as ITO and faces the second insulating layer 16 with the first adhesive layer 18 interposed therebetween. The ground electrode layer 20 can be used for maintaining stability between the touch screen panel and the display panel, and can also be used for forming electrostatic capacitances with the sensing patterns 12 and 14 depending on a designing method of the touch screen panel.

That is, in an electrostatic capacitance type touch screen panel, electrostatic capacitances between the X and Y sensing patterns 12 and 14 and the ground electrode layer 20 can be utilized to sense a contact position.

In addition, a buffer film 19 can be formed between the first adhesive layer 18 and the ground electrode layer 20. The buffer film 19 is formed on a lower surface (the surface that faces the display panel) of the first adhesive layer 18.

The buffer film 19 is made of a polymer material such as polyethylene terephthalate (PET), and improves the durability of the touch screen panel.

Furthermore, the buffer film 19 improves the sensitivity of the touch screen panel. To be more specific, when the buffer film 19 is provided, the distance between the sensing patterns 12 and 14 and the ground electrode layer 20 increases, such that the electrostatic capacitances formed between the sensing patterns 12 and 14 and the ground electrode layer 20 are reduced. Therefore, since the touch screen panel reacts more sensitively to contacts of similar degree, a highly sensitive touch screen panel can be realized.

In some embodiments, the ground electrode layer 20 may not be provided in the touch screen panel, but may instead be provided on the surface of the display panel coupled to the touch screen panel.

As described above, according to embodiments of the present invention, the transparent substrate 10 of the touch screen panel is integrated with the window.

As described above, in order for the transparent substrate 10 to also function as the window, the tempering process is performed on the transparent substrate 10.

The transparent substrate 10, for example, a glass substrate, is tempered through a process of steeping the substrate in a $KNO_3$ solution to heat the substrate at a temperature between 400° C. and 450° C. for approximately 15 to 18 hours. A sodium (Na) component that exists on the surface of the substrate is replaced by a potassium (K) component through this process to improve the strength of the surface of the substrate.

That is, the Na component that exists on the surfaces 11 of the transparent substrate 10 where the tempering process is performed is replaced by the K component to improve the strength of the transparent substrate 10.

In the conventional art, the tempering process is performed on a window after cutting the window into unit cells. Then, the touch screen panel is attached onto the tempered window. However, mass production of the touch screen panel is difficult using the above-described manufacturing method.

According to an embodiment of the present invention, the tempering process performed on the transparent substrate 10 in order to utilize the transparent substrate 10 as a window is performed on a mother substrate before cutting the substrate into unit cells. Therefore, the strength (e.g., breaking strength) of the touch screen panel is improved, while mass production can be more readily realized.

Hereinafter, referring to FIGS. 3A to 3E, a process of manufacturing a touch screen panel according to an embodiment of the present invention will be described in detail.

FIGS. 3A to 3E are schematic cross-sectional views sequentially illustrating a method of manufacturing a touch screen panel according to an embodiment of the present invention.

Figure 3A:
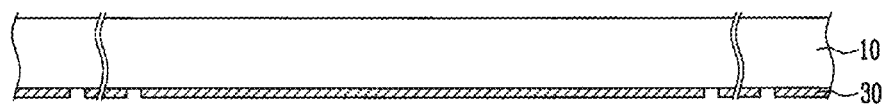
FIGS. 3A to 3E are schematic cross-sectional views sequentially illustrating a method of manufacturing a touch screen panel according to an embodiment of the present invention.

First, referring to FIG. 3A, a photoresist film 30 is formed on one surface of a mother substrate, that is, a large transparent substrate 10 on which a plurality of touch screen panels are to be formed in unit cells. The photoresist film in regions where cutting between unit cells is to be performed is removed through exposing and developing processes.

Figure 3B:
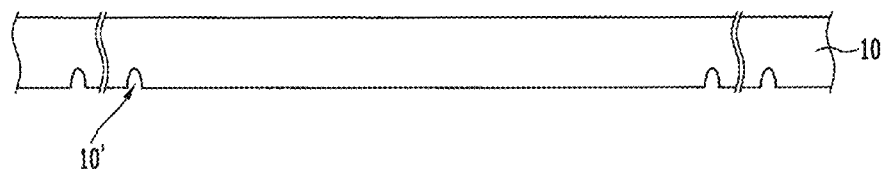

Then, as illustrated in FIG. 3B, dry etching is performed on the transparent substrate 10 so that the photoresist film 30 is removed and that a partial region 10' of the exposed substrate is etched. In addition, after performing the dry etching, any remaining photoresist film 30 on the transparent substrate 10 is removed.

Figure 3C:
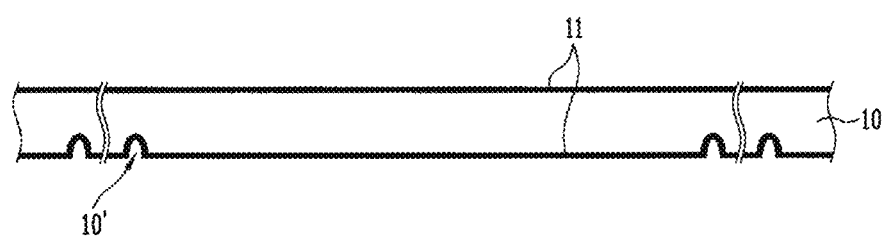

Then, as illustrated in FIG. 3C, the tempering process is performed on the surfaces 11 of the transparent substrate 10, including the partially etched regions.

The transparent substrate 10 is tempered through the process of steeping the substrate in the $KNO_3$ solution to heat the substrate at a temperature between 400° C. and 450° C. for 15 to 18 hours. Through the process, the Na component that exists on the surfaces 11 of the substrate is replaced by the K component to improve the strength of the surface of the substrate. However, this is only an illustrative embodiment, and the tempering process of the substrate is not limited thereto.

According to embodiments of the present invention, the tempering process is performed on the mother substrate where a plurality of touch screen panels are formed in unit cells. The tempering process is also performed on the regions where cutting is to be performed, that is, on parts 10' in which the mother substrate 10 has been etched. Therefore, mass production is more readily accomplished, in comparison to the conventional art in which cutting is performed on individual unit cells prior to the tempering process, while maintaining a high level of strength (e.g., breaking strength) in the touch screen panels.

After performing the tempering process on the mother substrate 10, components that form the touch screen panel are sequentially formed in each cell unit region partitioned off by the etched parts 10'.

Figure 3D:
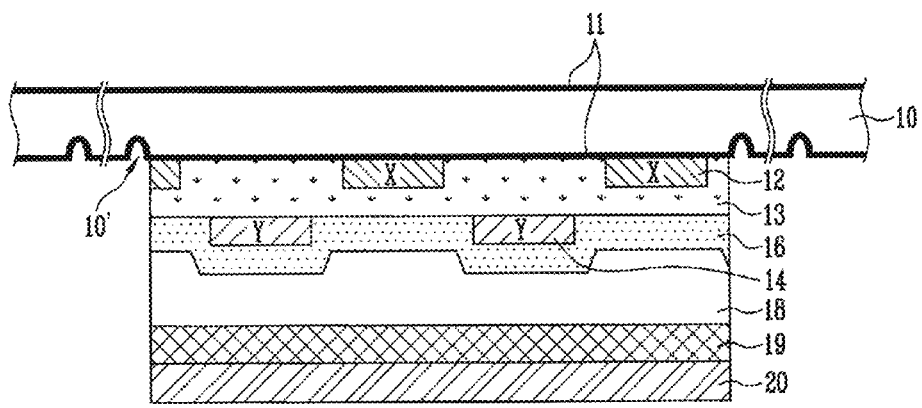

That is, as illustrated in FIG. 3D, the X sensing patterns 12, the first insulating layer 13, the Y sensing patterns 14, the second insulating layer 16, the first adhesive layer 18, the buffer film 19, and the ground electrode layer 20 are sequentially formed in each cell unit region on the tempered mother substrate.

To be more specific, after forming a transparent electrode material such as ITO in each cell unit region, the transparent electrode material is patterned to form the X sensing patterns 12. Here, the coupling parts of the X sensing patterns 12 are not illustrated. However, the X sensing patterns 12 are coupled to each other in a first direction (for example, a column direction) in each cell unit region.

Then, a first insulating material is formed on the X sensing patterns 12 using, for example, a printing method, and is annealed to form the first insulating layer 13. However, the present invention is not limited thereto. For example, the first insulating layer 13 can be formed by a chemical vapor deposition (CVD) method or a sputtering method.

Then, after forming another transparent electrode material on the first insulating layer 13, that transparent electrode material is patterned to form the Y sensing patterns 14. Here, the Y sensing patterns 14 are arranged not to overlap the X sensing patterns 12 (the coupling parts between the Y sensing patterns 14 excluded). Although not shown, the Y sensing patterns 14 are coupled to each other in a second direction (for example, a row direction). After forming the Y sensing patterns 14, the metal patterns 15 illustrated in FIG. 1 and position detecting lines (not shown) may further be formed using a low resistance material having a lower surface resistance than the transparent electrode material, such as a three-layered film of Mo/Al/Mo or a chrome film.

Then, a second insulating material is formed on the Y sensing patterns 14 and the metal patterns using, for example, a printing method, and is annealed to form the second insulating layer 16. Again, a method of forming the second insulating layer 16 is not limited thereto. For example, the second insulating layer 16 can also be formed using the CVD method or the sputtering method.

Then, the first adhesive layer 18, the buffer film 19, and the ground electrode layer 20 are sequentially formed on the second insulating layer 16.

At this time, the first adhesive layer 18 can be made of a transparent adhesive material having high transmittance such as super view resin (SVR) and/or optical cleared adhesive (OCA).

In addition, the ground electrode layer 20 can be made of a transparent electrode material such as ITO. The ground electrode layer 20 can be used for maintaining stability between the touch screen panel and the display panel and can be utilized for forming electrostatic capacitances with the sensing patterns 12 and 14, depending on a design method of the touch screen panel. That is, in the electrostatic capacitance type touch screen panel, to sense the contact position, electrostatic capacitances between the X and Y sensing patterns 12 and 14 and the ground electrode layer 20 can be utilized.

In addition, the buffer film 19 formed between the first adhesive layer 18 and the ground electrode layer 20 can be made of a polymer material such as polyethylene terephthalate (PET) for improving the durability and sensitivity of the touch screen panel.

Figure 3E:
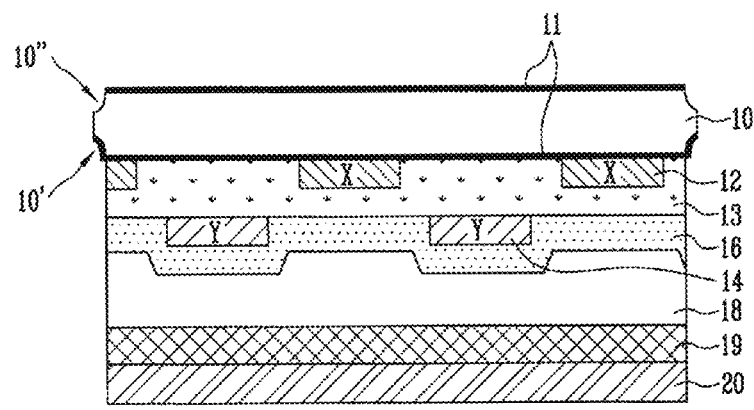

When a touch screen panel is formed in each cell unit region of the tempered mother substrate, then, as illustrated in FIG. 3E, the mother substrate is cut into unit cells.

That is, dry etching is performed on a part 10″ on a surface of the mother substrate opposite the surface including the etched parts 10′ by utilizing substantially the same method as illustrated in FIGS. 3A and 3B, so that substantially the same regions are etched. The etched regions, that is, the regions dividing the touch screen panels into unit cells, is scribed and separated.

Therefore, in the touch screen panel according to an embodiment of the present invention, since the surface 11 (excluding a portion of the edges of the substrate) is tempered, the strength of the touch screen panel can be maintained.

That is, since the scribing region on one surface of the mother substrate was partially etched and the etched parts 10′ were tempered, when the mother substrate is cut into unit cells, the surface 11 excluding only a portion of the edges is tempered.

FIG. 4 is a flow diagram illustrating a method of manufacturing touch screen panels according to an embodiment of the present invention.

Referring to FIG. 4, first in block 101, a photoresist film is formed on a first surface of a substrate having high transmittance, for example, a glass substrate or other transparent substrate.

In block 103, the photoresist film is removed in regions between unit cells at which touch screen panels will be formed, or in other words, in regions where the substrate is to be etched. The photoresist film may be removed, for example, by utilizing exposing and developing processes.

In block 105, the substrate is etched in the regions where the photoresist film has been removed. The substrate may be etched by performing dry etching, however, in other embodiments, other types of etching may alternatively be performed.

In block 107, the remaining photoresist film is removed from the substrate after the substrate has been etched.

In block 109, a tempering process is performed on the substrate. The tempering process may be performed on the entire substrate, including the etched regions. In some embodiments, the tempering process is performed by steeping the substrate in a $KNO_3$ solution, where the substrate is heated at a temperature between 400° C. and 450° C. for approximately 15 to 18 hours. The tempering process may replace a sodium (Na) component on surfaces of the substrate with a potassium (K) component, thereby improving the strength of the substrate.

In block 111, touch screen panels are formed on the first surface of the substrate at the unit cells defined by the etched regions. The touch screen panels may be formed similarly as described with respect to FIGS. 2 and 3D above. Generally, forming the touch screen panels involves sequentially forming first sensing patterns (e.g., X sensing patterns), second sensing patterns (e.g., Y sensing patterns), an insulating layer, an adhesive layer, a buffer film, and a ground electrode at each of the unit cells. More or less components and/or layers may be formed in the touch screen panels in different embodiments.

In block 113, the substrate is cut at the etched regions to separate the touch screen panels. In some embodiments, as described with respect to FIG. 3E above, an etching process, similar to the process performed on the first surface of the substrate, is performed on a second surface of the substrate opposite the first surface. That is, etching is performed on the second surface of the substrate at the regions between the unit cells prior to cutting the substrate. Accordingly, the tempered surface at the regions between the unit cells on the second surface is removed. Then, the substrate is cut at the etched regions to separate the touch screen panels into unit cells.

As indicated above, according to an embodiment of the present invention, since the surface of the substrate, excluding an edge region of the second surface of the substrate, is tempered, the strength (e.g., breaking strength) of the touch screen panel can be maintained.

Through the above processes, the tempering process is performed on the glass substrate used as the window while in the mother substrate state, such that the strength of the touch screen panel can be maintained, while mass production can be more readily accomplished. In addition, the first and second sensing electrodes are formed on the window, such that the thickness of the touch screen panel can be minimized or reduced. Mask processes are also minimized or reduced, and processes are simplified, such that manufacturing efficiency can also be improved.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A method of manufacturing touch screen panels, comprising:
    forming a photoresist film on a first surface of a substrate having high transmittance;
    removing the photoresist film in regions between unit cells by utilizing exposing and developing processes;
    etching the substrate in the regions where the photoresist film has been removed;
    removing the photoresist film from the substrate after the etching;
    performing a tempering process on the substrate including the etched regions;
    forming touch screen panels at the unit cells defined by the etched regions on the first surface of the substrate; and
    cutting the substrate at the etched regions to separate the touch screen panels.

2. The method as claimed in claim 1, wherein the forming the touch screen panels at the unit cells comprises sequentially forming first sensing patterns, second sensing patterns, an insulating layer, an adhesive layer, a buffer film, and a ground electrode layer at each of the unit cells.

3. The method as claimed in claim 2, wherein the first sensing patterns are coupled to each other in a first direction, and wherein the second sensing patterns are coupled to each other in a second direction that crosses the first direction.

4. The method as claimed in claim 1, wherein the performing the tempering process comprises steeping the substrate in a $KNO_3$ solution to heat the substrate at a temperature between 400° C. and 450° C. for approximately 15 to 18 hours.

5. The method as claimed in claim 4, wherein the substrate comprises glass, and wherein the tempering process replaces a sodium (Na) component on surfaces of the substrate with a potassium (K) component.

6. The method as claimed in claim 1, further comprising etching a second surface of the substrate opposite the first surface at the regions between the unit cells after forming the touch screen panels and prior to cutting the substrate, such that a tempered surface at the regions between the unit cells on the second surface of the substrate is removed.

7. The method as claimed in claim 1, wherein the etching comprises dry etching.

* * * * *

UNITED STATES PATENT AND TRADEMARK OFFICE
CERTIFICATE OF CORRECTION

PATENT NO. : 8,568,600 B2  Page 1 of 1
APPLICATION NO. : 12/631788
DATED : October 29, 2013
INVENTOR(S) : Sung-Ku Kang et al.

It is certified that error appears in the above-identified patent and that said Letters Patent is hereby corrected as shown below:

On the Title Page

(56) References Cited,   Delete "KR 020080058862 A"

Foreign Patent Documents,   Insert -- KR 1020080058862 A -- line 4

Signed and Sealed this
Twenty-first Day of April, 2015

Michelle K. Lee
*Director of the United States Patent and Trademark Office*